United States Patent
Katase et al.

(10) Patent No.: US 12,498,260 B2
(45) Date of Patent: Dec. 16, 2025

(54) SENSOR DEVICE

(71) Applicant: KOA CORPORATION, Nagano (JP)

(72) Inventors: Yasuyuki Katase, Nagano (JP); Toshiya Yasue, Nagano (JP)

(73) Assignee: KOA CORPORATION, Nagano (JP)

( * ) Notice: Subject to any disclaimer, the term of this patent is extended or adjusted under 35 U.S.C. 154(b) by 281 days.

(21) Appl. No.: 18/272,660

(22) PCT Filed: Jan. 20, 2022

(86) PCT No.: PCT/JP2022/001945
§ 371 (c)(1),
(2) Date: Jul. 17, 2023

(87) PCT Pub. No.: WO2022/163485
PCT Pub. Date: Aug. 4, 2022

(65) Prior Publication Data
US 2024/0077347 A1   Mar. 7, 2024

(30) Foreign Application Priority Data

Jan. 27, 2021   (JP) .................................. 2021-010735

(51) Int. Cl.
*G01F 1/69*     (2006.01)
*G01F 1/696*    (2006.01)
(Continued)

(52) U.S. Cl.
CPC .............. *G01F 1/69* (2013.01); *G01F 1/6965* (2013.01)

(58) Field of Classification Search
CPC .......... G01F 1/69; G01F 1/6965; G01P 5/001; G01P 5/12
See application file for complete search history.

(56) References Cited

U.S. PATENT DOCUMENTS

| 5,952,571 A | * | 9/1999 | Arai | ....................... G01F 1/684 73/114.34 |
| 2007/0250276 A1 | | 10/2007 | Mangalam et al. | |
| 2015/0308874 A1 | * | 10/2015 | Nagatomo | .............. G01F 1/684 73/204.26 |

FOREIGN PATENT DOCUMENTS

JP    2-170017 A    6/1990
JP    4-29017 A     1/1992
(Continued)

OTHER PUBLICATIONS

International Search Report issued in WIPO Patent Application No. PCT/JP2022/001945, dated Apr. 5, 2022, along with an English translation thereof.

*Primary Examiner* — Laura Martin
*Assistant Examiner* — Anthony W Megna Fuentes
(74) *Attorney, Agent, or Firm* — Greenblum & Bernstein, P.L.C.

(57) ABSTRACT

An object is to provide a sensor device capable of highly accurately detecting a flow rate at 360 degrees in a radial direction with respect to a first sensor element including a resistive element for flow rate detection. A sensor device according to the present invention includes a substrate, a first sensor element including a resistive element for flow rate detection, and a second sensor element including a resistive element for temperature compensation. Each of the first sensor element and the second sensor element is supported to be separated from a surface of the substrate via a pair of lead wires, and the first sensor element is disposed at a higher position than the second sensor element.

5 Claims, 10 Drawing Sheets

(51) Int. Cl.
*G01P 5/00* (2006.01)
*G01P 5/12* (2006.01)

(56) References Cited

FOREIGN PATENT DOCUMENTS

| | | | | |
|---|---|---|---|---|
| JP | H07229914 A | * | 8/1995 | ................ G01P 5/12 |
| JP | 11-83887 A | | 3/1999 | |
| JP | 2000-329599 A | | 11/2000 | |
| JP | 2019-215163 A | | 12/2019 | |
| JP | 2020-51755 A | | 4/2020 | |

* cited by examiner

SENSOR DEVICE

TECHNICAL FIELD

The present invention relates to a sensor device capable of measuring a wind velocity, for example.

BACKGROUND ART

A thermal sensor device is known that exposes a heated resistive element for flow rate detection to a fluid and that detects the flow rate of the fluid based on heat radiation at that time. The sensor device includes a resistive element for temperature compensation in addition to the resistive element for flow rate detection, and the resistive element for flow rate detection and the resistive element for temperature compensation are incorporated in a bridge circuit. When the resistive element for flow rate detection receives a fluid, the temperature of the resistive element for flow rate detection decreases and the resistance of the resistive element for flow rate detection changes, whereby a differential output can be obtained in the bridge circuit. Based on this differential output, the flow rate of the fluid can be detected.

For example, in Patent Literature 1, a first sensor element including a resistive element for flow rate detection and a second sensor element including a resistive element for temperature compensation are supported to be separated from an insulating substrate via lead wires. In Patent Literature 1, the first sensor element and the second sensor element are arranged to face each other (FIG. 1 and the like).

CITATION LIST

Patent Literature

Patent Literature 1: JP 2019-215163 A

SUMMARY OF INVENTION

Technical Problem

As described above, in Patent Literature 1, since the first sensor element and the second sensor element are arranged to face each other, when wind acts in the radial direction of the first sensor element including the resistive element for flow rate detection, flow rate detection at 360 degrees in the radial direction is degraded.

Therefore, the present invention has been made in view of the above problems, and an object of the present invention is to provide a sensor device capable of highly accurately detecting a flow rate at 360 degrees in a radial direction with respect to a first sensor element including a resistive element for flow rate detection.

Solution to Problem

A sensor device according to the present invention includes a substrate, a first sensor element including a resistive element for flow rate detection, and a second sensor element including a resistive element for temperature compensation, in which each of the first sensor element and the second sensor element is supported to be separated from a surface of the substrate via a pair of lead wires, and the first sensor element is disposed at a position higher than the second sensor element.

Advantageous Effects of Invention

In the sensor device according to the present invention, it is possible to accurately perform flow rate detection at 360 degrees in a radial direction with respect to the first sensor element including the resistive element for flow rate detection.

DESCRIPTION OF EMBODIMENTS

An embodiment (hereinafter simply referred to as an "embodiment") of the present invention is described in detail below. The present invention is not limited to the following embodiments, and can be subjected to various modifications for implementation within the scope of the gist thereof.

<Description of Sensor Device According to First Embodiment>

Figure 1A:
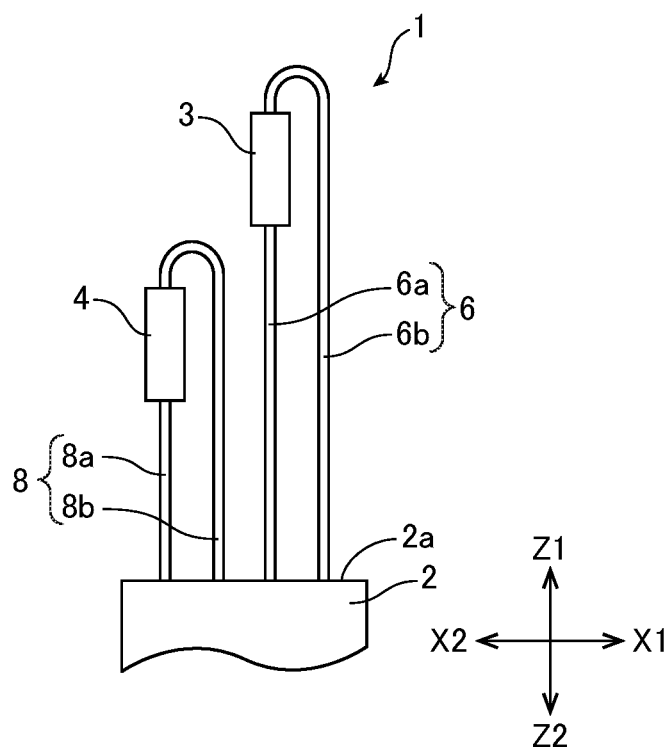
FIG. 1A is a partial side view of a sensor device according to a first embodiment.
Figure 1B:
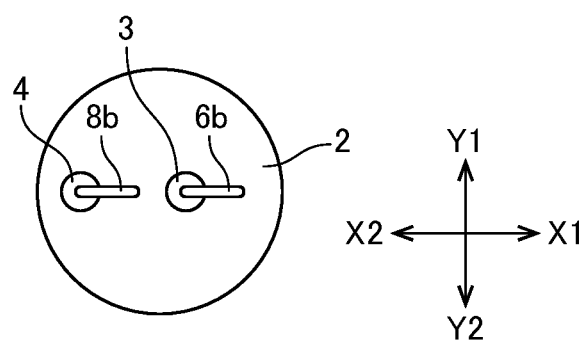
FIG. 1B is a partial plan view of the sensor device according to the first embodiment.
Figure 2:
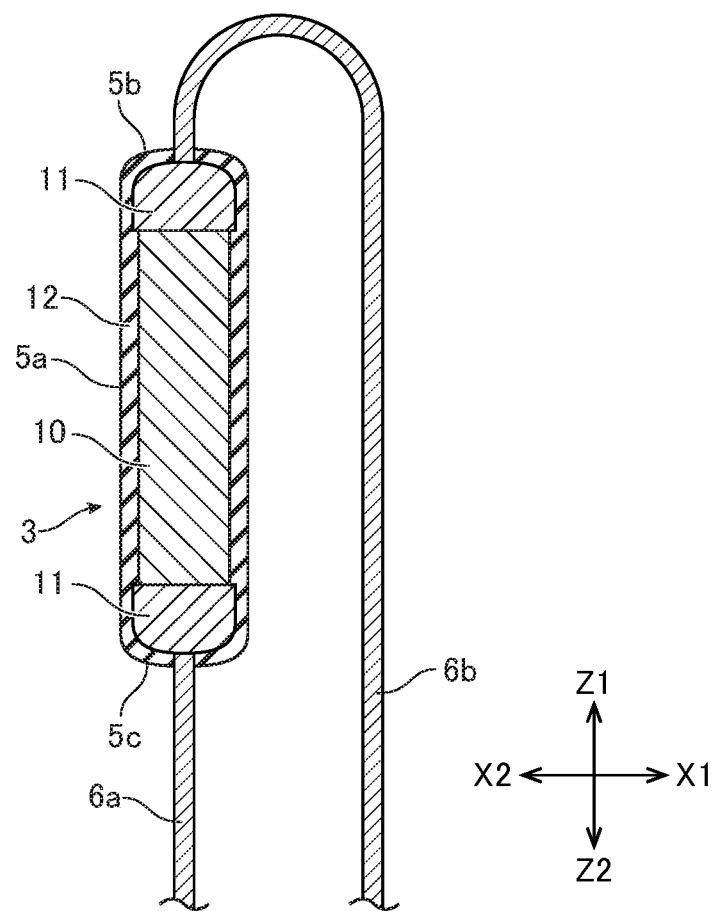
FIG. 2 is a cross-sectional view of a sensor element according to the present embodiment.
Figure 3:
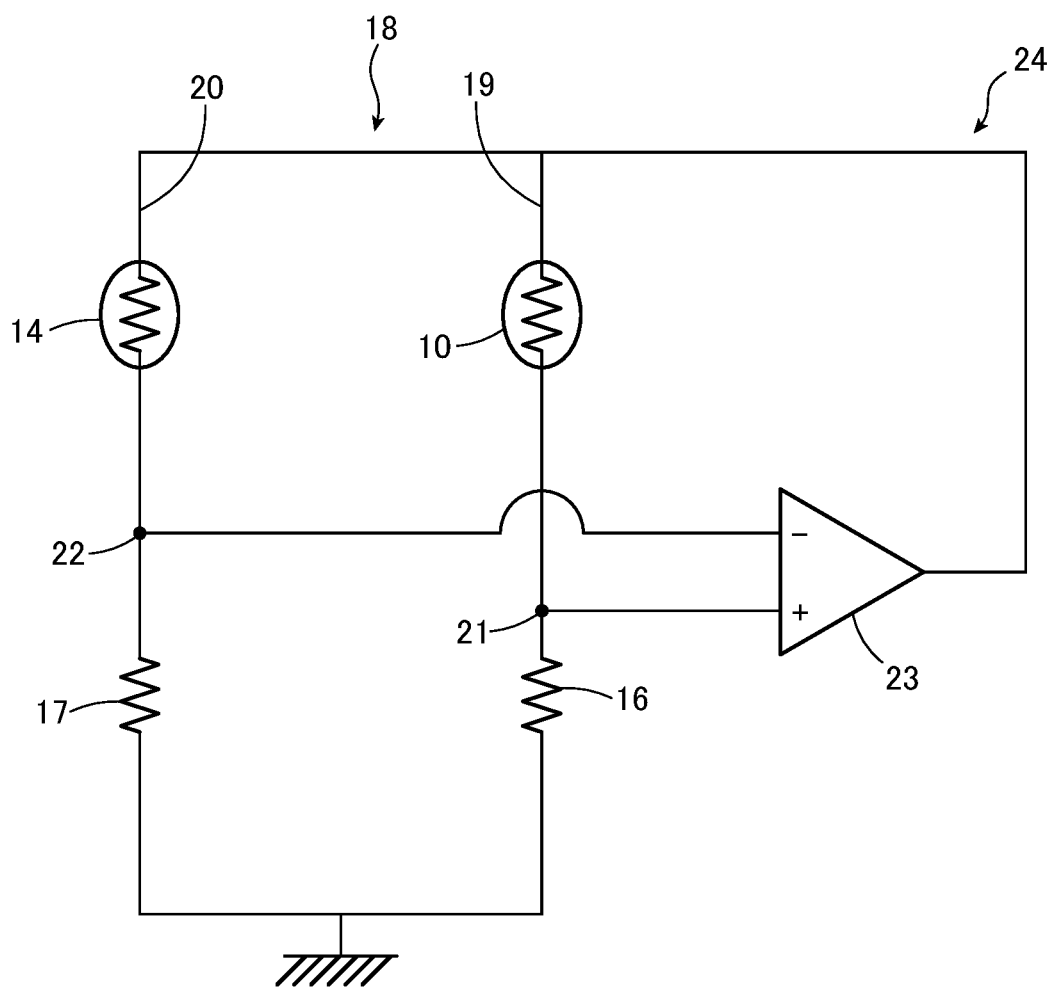
FIG. 3 is a circuit diagram of the sensor device according to the present embodiment.

FIG. 1A is a partial side view of a sensor device 1 according to a first embodiment. FIG. 1B is a partial plan view of the sensor device 1 according to the first embodiment. FIG. 2 is a cross-sectional view of a first sensor element 3 according to the present embodiment. FIG. 3 is a circuit diagram of the sensor device 1 according to the present embodiment.

An X1-X2 direction and a Y1-Y2 direction illustrated in FIG. 1B indicate two directions perpendicular to each other in a plane, and a Z1-Z2 direction illustrated in FIG. 1A indicates a height direction perpendicular to the X1-X2 direction and the Y1-Y2 direction.

The sensor device 1 according to the first embodiment illustrated in FIG. 1A includes a substrate 2, the first sensor element 3 including a resistive element for flow rate detection, and a second sensor element 4 including a resistive element for temperature compensation.

The substrate 2 is an insulating substrate, and is preferably, but not particularly limited to, a general printed substrate in which glass-fiber cloth is impregnated with an epoxy resin. An FR4 substrate can be proposed, for example.

As illustrated in FIG. 1A, the first sensor element 3 is supported to be separated from a surface 2a of the substrate 2 via a pair of first lead wires 6a and 6b in the Z1 direction. The first lead wires 6a and 6b may be hereinafter collectively referred to as a "first lead wire 6" without distinction.

As illustrated in FIG. 1A, the second sensor element 4 is supported to be separated from the surface 2a of the substrate 2 via a pair of second lead wires 8a and 8b in the Z1 direction in the same manner as the first sensor element 3. The second lead wires 8a and 8b may be hereinafter collectively referred to as a "second lead wire 8" without distinction. As described above, the first sensor element 3 and the second sensor element 4 are disposed on the same side as viewed from the substrate 2. As a result, the environmental temperatures acting on the first sensor element 3 and the second sensor element 4 can be made equal to each other, which can improve the accuracy of detection and contribute to the miniaturization.

The internal structure of the first sensor element 3 will be described with reference to FIG. 2. As illustrated in FIG. 2, the first sensor element 3 includes the resistive element 10 for flow rate detection, electrode caps 11 disposed on both sides of the resistive element 10 for flow rate detection, and an insulating film 12 covering the resistive element 10 for flow rate detection and the electrode caps 11.

The resistive element 10 for flow rate detection is formed of a columnar substrate made of ceramic or the like and having a resistance coating film formed on a surface of the columnar substrate, for example. Although not illustrated, the surface of the resistance coating film of the resistive element 10 for flow rate detection is trimmed to adjust resistance.

The outer surface of the first sensor element 3 includes an element surface 5a functioning as a flow rate detection surface, and an upper surface 5b and a lower surface 5c positioned above and below the element surface 5a.

As illustrated in FIG. 2, the first lead wire 6a extends in the Z2 direction from the electrode cap 11 located on the lower surface 5c side. In addition, the first lead wire 6b extends in the Z1 direction from the electrode cap 11 located on the upper surface 5b side, is bent in the middle, and extends in the Z2 direction. Therefore, as illustrated in FIG. 2, the first lead wires 6a and 6b face each other with a predetermined gap in the X1-X2 direction, and both extend in the Z2 direction. As illustrated in FIG. 1, ends of the pair of first lead wires 6a and 6b are connected to the surface 2a of the substrate 2.

The second sensor element 4 has the same structure as that illustrated in FIG. 2, but has a resistive element 14 for temperature compensation incorporated therein, instead of the resistive element 10 for flow rate detection.

As illustrated in FIG. 1, each of the first sensor element 3 and the second sensor element 4 has a shape elongated in one direction. In this case, "elongated in one direction" refers to a state of being longer than a length in any direction orthogonal to the one direction. Specifically, the first sensor element 3 and the second sensor element 4 are formed to be longer in the Z1-Z2 direction than in the X1-X2 direction and the Y1-Y2 direction. Although not limited, each of the first sensor element 3 and the second sensor element 4 is formed in a cylindrical shape.

As illustrated in FIG. 1B, the first sensor element 3, the second sensor element 4, the first lead wire 6b extending laterally on the X1 side with respect to the first sensor element 3, and the second lead wire 8b extending laterally on the X1 side with respect to the second sensor element 4 are arranged in a row in the X1-X2 direction.

As illustrated in FIG. 3, the resistive element 10 for flow rate detection and the resistive element 14 for temperature compensation form a bridge circuit. As illustrated in FIG. 3, the resistive element 10 for flow rate detection, the resistive element 14 for temperature compensation, and resistors 16 and 17 form a bridge circuit 18. As illustrated in FIG. 3, the resistive element 10 for flow rate detection and the resistor 16 form a first series circuit 19, and the resistive element 14 for temperature compensation and the resistor 17 form a second series circuit 20. Then, the first series circuit 19 and the second series circuit 20 are connected in parallel, thereby forming the bridge circuit 18.

As illustrated in FIG. 3, an output unit 21 of the first series circuit 19 and an output unit 22 of the second series circuit 20 are each connected to a differential amplifier (amplifier) 23. The bridge circuit 18 is connected to a feedback circuit 24 including the differential amplifier 23. The feedback circuit 24 includes a transistor (not illustrated) and the like.

Each of the resistors 16 and 17 has a lower temperature coefficient of resistance (TCR) than those of the resistive element 10 for flow rate detection and the resistive element 14 for temperature compensation. For example, the resistive element 10 for flow rate detection is controlled to be in a heated state so as to be at a temperature higher by a predetermined value than a predetermined ambient temperature and to have a predetermined resistance value Rs1. In addition, the resistive element 14 for temperature compensation is controlled so as to have a predetermined resistance value Rs2 at the ambient temperature. Note that the resistance value Rs1 is smaller than the resistance value Rs2. The resistor 16 that forms the first series circuit 19 together with the resistive element 10 for flow rate detection is, for example, a fixed resistor having a resistance value R1 similar to the resistance value Rs1 of the resistive element 10 for flow rate detection. Furthermore, the resistor 17 that forms the second series circuit 20 together with the resistive element 14 for temperature compensation is, for example, a fixed resistor having a resistance value R2 similar to the resistance value Rs2 of the resistive element 14 for temperature compensation.

As the resistive element 10 for flow rate detection is adjusted so as to have a temperature higher than the ambient temperature, the temperature of the resistive element 10 for flow rate detection serving as a heating resistor decreases when the first sensor element 3 receives wind. Therefore, the potential of the output unit 21 of the first series circuit 19 in which the resistive element 10 for flow rate detection is connected varies. As a result of this, a differential output is obtained by the differential amplifier 23. Then, the feedback circuit 24 applies a drive voltage to the resistive element 10 for flow rate detection based on the differential output. Then, a microcomputer (not illustrated) performs conversion on the basis of a change in voltage required for heating of the resistive element 10 for flow rate detection so as to obtain a wind velocity, and thus can output the wind velocity. The microcomputer is mounted on the surface of the substrate 2, for example, and is electrically connected to the sensor elements 3 and 4 via the lead wires 6 and 8.

Further, the resistive element 14 for temperature compensation detects the temperature of a fluid itself and compensates for an effect of a change in the temperature of the fluid. The resistive element 14 for temperature compensation that is provided as described above can reduce an effect of a change in the temperature of the fluid on flow rate detection, resulting in accurate flow rate detection. As described above, the resistive element 14 for temperature compensation is sufficiently higher in resistance than the resistive element 10 for flow rate detection and has its temperature set close to the ambient temperature. Hence, even when the resistive element 14 for temperature compensation receives wind, the potential of the output unit 22 of the second series circuit 20 connected to the resistive element 14 for temperature compensation hardly changes. Therefore, it is possible to accurately obtain the differential output based on a change in the resistance of the resistive element 10 for flow rate detection with respect to the potential of the output unit 22 as a reference potential.

The circuit configuration illustrated in FIG. 3 is a mere example, and the present embodiment is not limited thereto.

As illustrated in FIG. 1A, in the sensor device 1 according to the first embodiment, the first sensor element 3 including the resistive element 10 for flow rate detection is disposed at a position higher than the second sensor element 4 including the resistive element 14 for temperature compensation. That is, the first sensor element 3 is farther from the surface 2a of the substrate 2 in the Z1 direction than the second sensor element 4 is.

Figure 5:
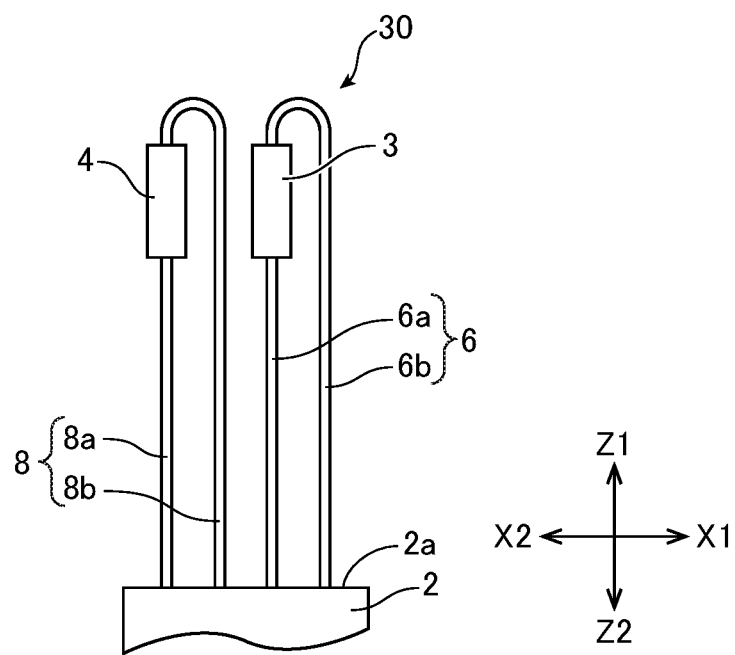
FIG. 5 is a partial side view of a sensor device according to a comparative example.

On the other hand, in a sensor device 30 according to a comparative example illustrated in FIG. 5, a first sensor element 3 including a resistive element 10 for flow rate detection and a second sensor element 4 including a resistive element 14 for temperature compensation are arranged at the same height. That is, in FIG. 5, the first sensor element 3 and the second sensor element 4 face each other in the X1-X2 direction which is the horizontal direction orthogonal to the height direction.

Using the sensor device 1 according to the first embodiment and the sensor device 30 according to the comparative example, experiments were conducted on flow rate detection when wind acted from horizontal 360 degrees. The experiment conducted using the sensor device 1 according to the first embodiment will be described as "Example 1".

In this case, the "horizontal direction" is a direction formed in a plane defined by the X1-X2 direction and the Y1-Y2 direction illustrated in FIG. 1B. As illustrated in FIGS. 1 and 5, the horizontal direction is a radial direction of the first sensor element 3 standing upright in the Z1-Z2 direction. For example, when the cross section of the first sensor element 3 is a circle, the horizontal direction means a perpendicular direction passing through the axial center of the first sensor element 3. The "horizontal 360 degrees" refer to all directions in a plane toward the axial center of the first sensor element 3, and have the same meaning as "360 degrees in the radial direction" with respect to the first sensor element 3.

In the experiment, wind acted on the sensor device 1 from the horizontal 360 degrees. For wind velocities, the motion frequency of an inverter was controlled in four stages of 3 Hz, 7 Hz, 10 Hz, and 14 Hz. The higher the motion frequency, the higher the wind velocities. The wind velocities were measured by the sensor device 1.

Figure 4:
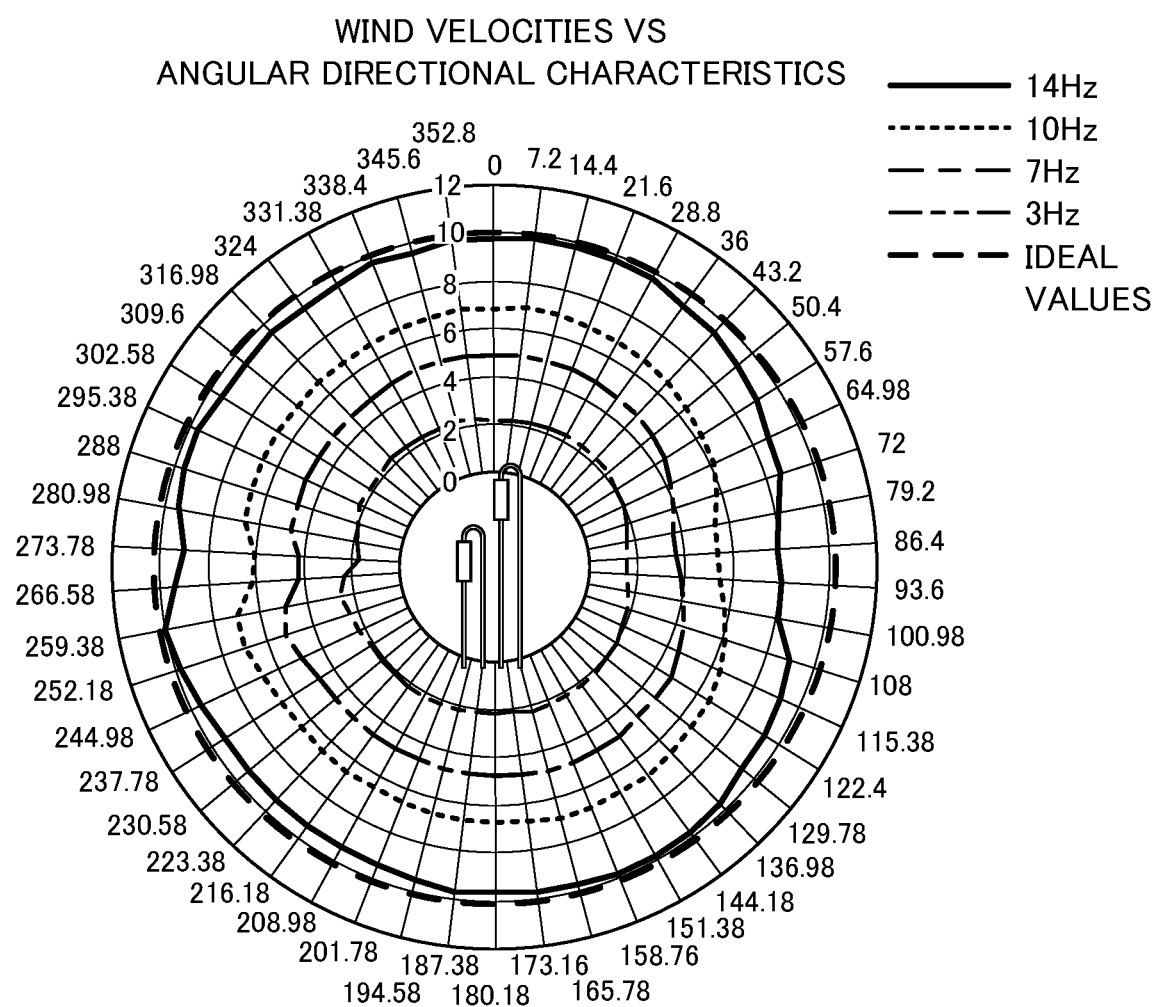
FIG. 4 illustrates results of an experiment conducted using the first sensor device, which indicate relationships between wind velocities and angular directional characteristics.
Figure 6:
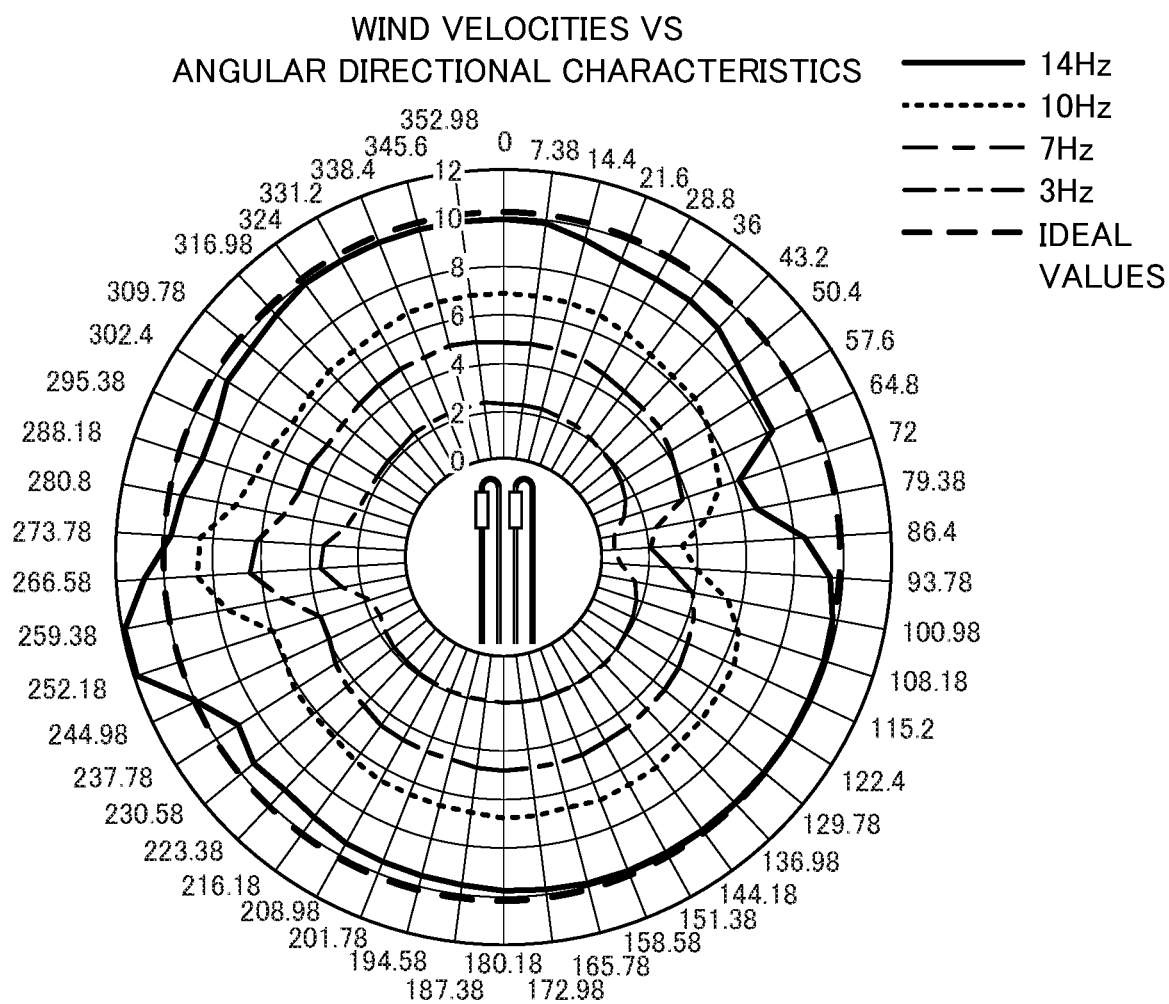
FIG. 6 illustrates results of an experiment conducted using the sensor device according to the comparative example, which indicate relationships between wind velocities and angular directional characteristics.

FIG. 4 illustrates experimental results of Example 1, and FIG. 6 illustrates experimental results of the comparative example. As illustrated in FIGS. 4 and 6, numerical values on outer circumferences of circular graphs imitating wind-rose plots indicate directions of wind toward the sensor devices 1 and 30 located at the centers.

Numerical values 0, 2, 6, 8, 10, and 12 in the circular graphs are the values of the wind velocities. Further, a plurality of bold-line curves in each of the circular graphs indicate measured values of wind velocities obtained when the motion frequency of the inverter was adjusted to 3 Hz, 7 Hz, 10 Hz, and 14 Hz and wind from each of the horizontal 360 degrees was measured by the sensor devices 1 and 30. FIGS. 4 and 6 also illustrate ideal values as ideal measured values when the motion frequency of the inverter is adjusted to 14 Hz.

As illustrated in FIGS. 4 and 6, it was found that, when the motion frequency of the inverter was 3 Hz, in the comparative example, flow rate detection for wind from directions of about 72 degrees to about 100 degrees and wind from directions of about 250 degrees to about 290 degrees was significantly degraded, as compared with Example 1. In addition, it was found that, when the motion frequency of the inverter was 7 Hz, in the comparative example, flow rate detection for wind from directions of about 72 degrees to about 102 degrees and wind from directions of about 250 degrees to about 285 degrees was significantly degraded, as compared with Example 1. In addition, it was found that, when the motion frequency of the inverter was 10 Hz, in the comparative example, flow rate detection for wind from directions of about 72 degrees to about 105 degrees and wind from directions of about 250 degrees to about 288 degrees was significantly degraded, as compared with Example 1. In addition, as compared with Example 1, in the comparative example, it was found that, when the motion frequency of the inverter was set to 14 Hz, measured values significantly deviated from the ideal values at angles around 65 degrees to 86 degrees and angles around 245 degrees to 270 degrees.

Wind from about 90 degrees and about 270 degrees is wind from the approximately X1-X2 direction, which substantially matches the arrangement direction of the first sensor element 3 and the second sensor element 4. In the comparative example, since the first sensor element 3 and the second sensor element 4 match in the height direction, in particular, it is considered that the detection of wind in a direction close to the X1-X2 direction which is the arrangement direction is strongly affected, and that the accuracy of the detection is significantly reduced.

On the other hand, in Example 1, as illustrated in FIG. 1A, the first sensor element 3 is disposed at a position higher than the second sensor element 4.

Therefore, the effect of the second sensor element 4 is smaller than that in the comparative example, and as illustrated in FIG. 4, it was found that the accuracy of detecting wind acting from directions close to the directions of 90 degrees and 270 degrees could be improved, as compared with the comparative example.

As described above, according to the sensor device 1 according to the first embodiment, it is possible to improve the accuracy of air volume detection at the horizontal 360 degrees.

In the first embodiment, the first sensor element 3 is preferably disposed at a position higher than the second lead wire 8b connected to the second sensor element 4. As illustrated in FIG. 1A, the second lead wire 8b extends to a position higher than the second sensor element 4. Therefore, the first sensor element 3 is disposed at a position higher than the second lead wire 8b such that the first sensor element 3 does not face the second sensor element 4 and the second lead wire 8b in the X1-X2 direction. As a result, it is possible to improve the accuracy of the air volume detection at the horizontal 360 degrees.

In the first embodiment, as illustrated in FIGS. 1A and 1B, the first sensor element 3 is connected on the X2 side of the pair of first lead wires 6a and 6b extending in the Z1-Z2 direction with the gap in the X1-X2 direction. Similarly, the second sensor element 4 is connected on the X2 side of the pair of second lead wires 8*a* and 8*b* extending in the Z1-Z2 direction with a gap in the X1-X2 direction. As described above, both the first sensor element 3 and the second sensor element 4 are connected on the same side of the pair of lead wires 6 and 8. This makes it possible to obtain a structure in which the first sensor element 3 and the second sensor element 4 are not excessively separated. Although not illustrated, when a protective structure is used for each of the sensor elements 3 and 4, it is considered that the effect of the protective structure on each of the sensor elements 3 and 4 can be weakened or variation in the effect can be reduced by arranging the sensor elements 3 and 4 close to each other.

<Description of Sensor Device According to Second Embodiment>

Figure 7:
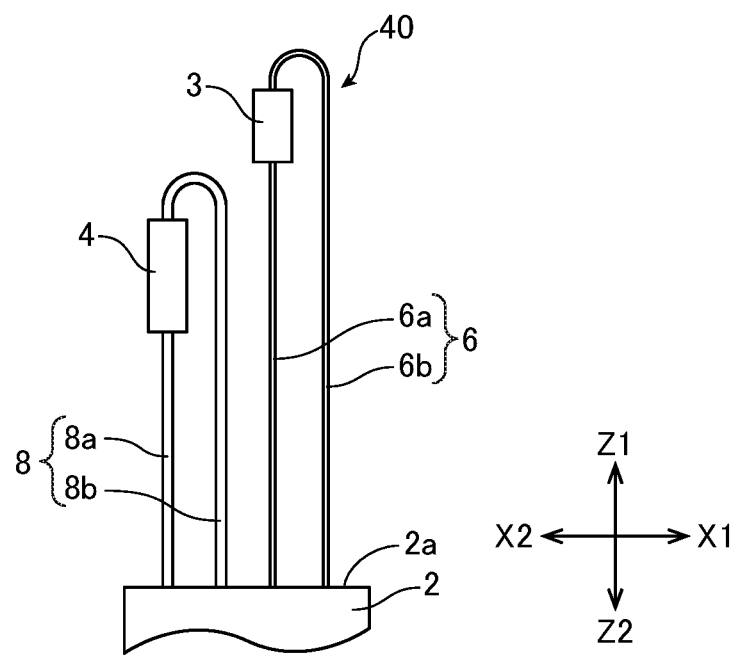
FIG. 7 is a partial side view of a sensor device according to a second embodiment.

FIG. 7 is a partial side view of a sensor device 40 according to a second embodiment. When a difference from the sensor device 1 illustrated in FIG. 1A is mainly described, in the first embodiment, the pair of lead wires 6 and 8 connected to the sensor elements 3 and 4 has the same wire diameter. On the other hand, in the second embodiment, a wire diameter of a pair of first lead wires 6 connected to a first sensor element 3 is smaller than a wire diameter of a pair of second lead wires 8 connected to a second sensor element 4.

Figure 8:
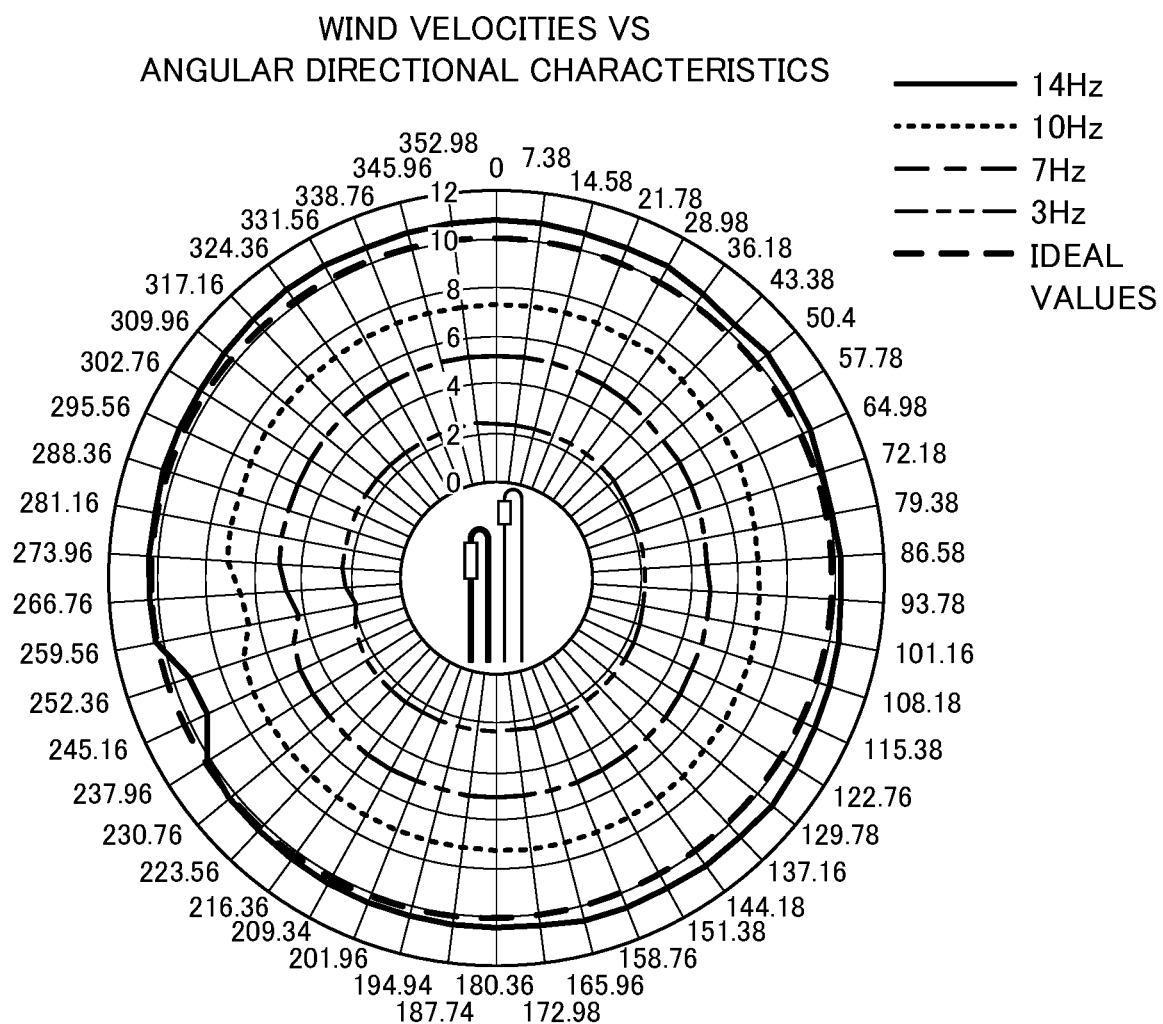
FIG. 8 illustrates results of an experiment conducted using the sensor device according to the second embodiment, which indicate relationships between wind velocities and angular directional characteristics.

FIG. 8 illustrates results of an experiment conducted using the sensor device according to the second embodiment, which indicate relationships between wind velocities and angular directional characteristics. The experiment conducted using the sensor device 40 according to the second embodiment will be described as "Example 2".

As illustrated in FIG. 8, in Example 2, it was found that the accuracy of air volume detection at horizontal 360 degrees was further improved as compared with Example 1 illustrated in FIG. 4. In particular, the accuracy of air volume detection for wind from directions of about 72 degrees to about 150 degrees was greatly improved, and substantially matched with ideal values. This is because the effect of the first lead wires 6 on the first sensor element 3 is weakened. That is, as illustrated in FIG. 7, the first sensor element 3 and the first lead wire 6*b* face each other in the X1-X2 direction. Therefore, in particular, wind acting from the right side to the left side in the drawing is affected by the first lead wire 6*b* before reaching the first sensor element 3. Therefore, by making the first lead wires 6 thinner than the second lead wires 8, the effect of the first lead wires 6 on the first sensor element 3 can be weakened at the time of air volume detection. As a result, as compared with FIG. 4, the accuracy of detecting wind acting from a direction close to the X1-X2 direction can be further improved, and furthermore, the accuracy of detection at the horizontal 360 degrees can be more effectively improved.

<Description of Sensor Device According to Third Embodiment>

Figure 9:
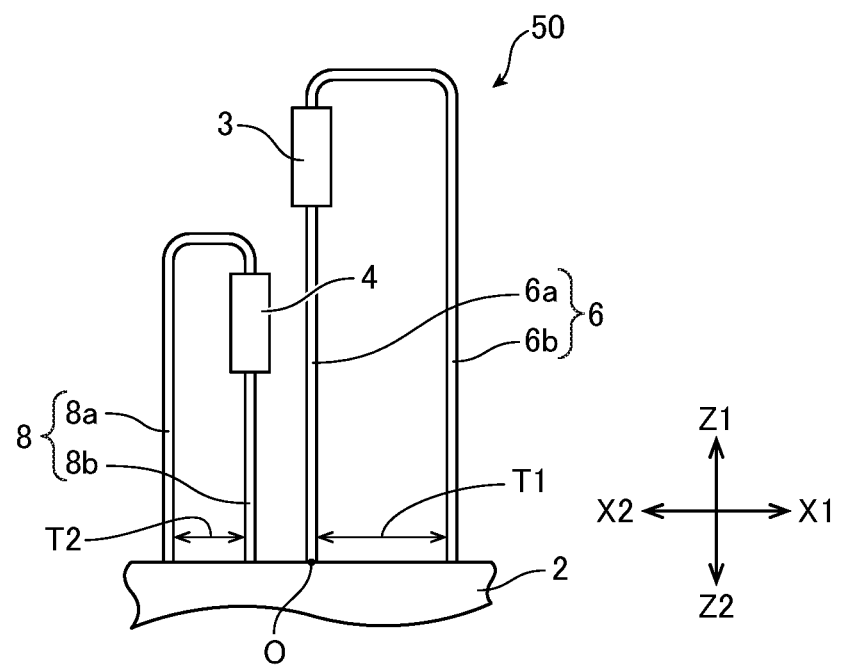
FIG. 9 is a partial side view of a sensor device according to a third embodiment.

FIG. 9 is a partial side view of a sensor device 50 according to a third embodiment. When a difference from the sensor device 1 illustrated in FIG. 1A is mainly described, in the first embodiment, the sensor elements 3 and 4 are connected to the pair of lead wires 6 and 8 so as to face the same side. That is, the first sensor element 3 and the second sensor element are connected to the first lead wire 6*a* and the second lead wire 8*a* located on the X2 side. On the other hand, in the third embodiment, sensor elements 3 and 4 are connected to a pair of lead wires 6 and 8 so as to face inward. That is, the first sensor element 3 is connected to the first lead wire 6*a* located on the X2 side, and the second sensor element 4 is connected to the second lead wire 8*b* located on the X1 side.

In addition, a distance T1 between the pair of first lead wires 6*a* and 6*b* connected to the first sensor element 3 is longer than a distance T2 between the pair of second lead wires 8*a* and 8*b* connected to the second sensor element 4. For example, the first sensor element 3 connected to the first lead wire 6*a* can be disposed at a center position between the first lead wire 6*b* and the second lead wire 8*a* located on the outer side. For example, the first sensor element 3 can be disposed above the center O of the substrate 2, and the first lead wire 6*b* and the second lead wire 8*a* can be disposed on the X1 side and the X2 side at positions distant by the same distance from the first sensor element 3.

Figure 10:
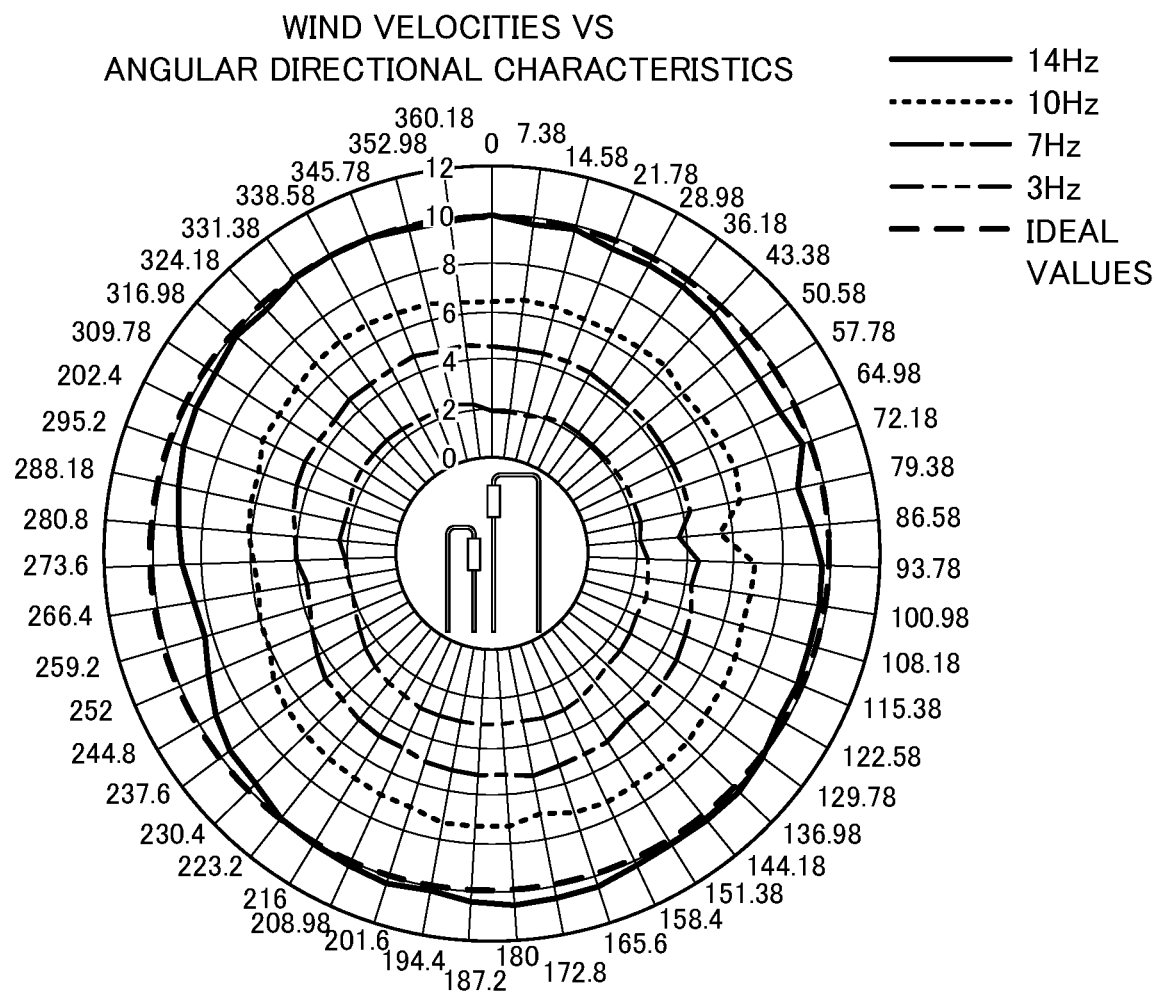
FIG. 10 illustrates results of an experiment conducted using the sensor device according to the third embodiment, which indicate relationships between wind velocities and angular directional characteristics.

FIG. 10 illustrates results of an experiment conducted using the sensor device according to the third embodiment, which indicate relationships between wind velocities and angular directional characteristics. The experiment conducted using the sensor device 50 according to the third embodiment will be described as "Example 3".

As illustrated in FIG. 10, in Example 3, it was found that the accuracy of air volume detection at horizontal 360 degrees was further improved as compared with Example 1 illustrated in FIG. 4. Although slight drops were observed at angles around 80 degrees to 90 degrees, it was found that the accuracy of air volume detection for wind from directions of about 43 degrees to about 140 degrees could be greatly improved as compared with Example 1. This is because the distance T2 between the first sensor element 3 and the first lead wire 6*b* is increased, and the first sensor element 3 can be disposed above the center O of the substrate 2, so that wind from the horizontal 360 degrees appropriately acts on the first sensor element 3. In addition, the first sensor element 3 and the second sensor element 4 can be disposed as close as possible. As a result, as compared with FIG. 4, the accuracy of detecting wind acting from a direction close to the X1-X2 direction can be further improved, and furthermore, the accuracy of detection at the horizontal 360 degrees can be more effectively improved.

Though the sensor device 1 has been described above as a device that detects wind, the fluid to be detected may be gas or liquid other than wind.

INDUSTRIAL APPLICABILITY

In the present invention, the detection at the horizontal 360 degrees can be performed with high accuracy, and can be applied to various applications. For example, the present invention can be applied to air conditioning equipment, a wind control system, analysis, and the like.

The present application is based on Japanese Patent Application No. 2021-010735, filed on Jan. 27, 2021. The entire contents thereof are incorporated herein by reference.

The invention claimed is:

1. A sensor device comprising:
a substrate;
a first sensor element including a resistive element for flow rate detection; and
a second sensor element including a resistive element for temperature compensation, wherein
each of the first sensor element and the second sensor element is supported to be separated from a surface of the substrate via a pair of lead wires,
the first sensor element is disposed at a position higher than the second sensor element,
the first sensor element and the second sensor element are connected to the pairs of lead wires so that the first sensor element and the second sensor element face inward, a first distance between the pair of lead wires that are connected to the first sensor element and to the substrate is constant from the surface of the substrate to a height at which the flow-rate detection resistive element is mounted, a second distance between the pair of lead wires that are connected to the second sensor element and to the substrate is constant from the surface of the substrate to a height at which the temperature-compensation resistive element is mounted, and the first distance at the surface of the substrate is wider than the second distance at the surface of the substrate.

2. The sensor device according to claim 1, wherein the first sensor element is disposed at a position higher than the lead wires connected to the second sensor element.

3. The sensor device according to claim 1, wherein a wire diameter of a first lead wire connected to the first sensor element is equal to or smaller than a wire diameter of a second lead wire connected to the second sensor element.

4. The sensor device according to claim 1, wherein each of the first sensor element and the second sensor element has a shape elongated in a height direction.

5. The sensor device according to claim 1, wherein
one of the pair of lead wires connected to the first sensor element is straight from the surface of the substrate to a connection position where the first sensor element is connected to the one of the pair of lead wires connected to the first sensor element, and one of the pair of lead wires connected to the second sensor element is straight from the surface of the substrate to a connection position where the second sensor element is connected to the one of the pair of lead wires connected to the second sensor element.

* * * * *